US006873883B2

United States Patent
Ziarnik

(10) Patent No.: US 6,873,883 B2
(45) Date of Patent: Mar. 29, 2005

(54) ADAPTIVE FAN CONTROLLER FOR A COMPUTER SYSTEM

(75) Inventor: Gregory P. Ziarnik, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 357 days.

(21) Appl. No.: 10/036,273

(22) Filed: Dec. 26, 2001

(65) Prior Publication Data

US 2003/0120394 A1 Jun. 26, 2003

(51) Int. Cl.[7] .............................................. G05D 23/00
(52) U.S. Cl. ...................... 700/300; 702/132; 318/471; 361/695
(58) Field of Search ............................... 700/300, 276, 700/12; 713/300, 320; 702/132; 361/695, 687; 318/471, 473

(56) References Cited

U.S. PATENT DOCUMENTS

| | | | |
|---|---|---|---|
| 5,566,377 A | 10/1996 | Lee | 361/695 |
| 5,731,954 A | 3/1998 | Cheon | 361/699 |
| 5,805,403 A | 9/1998 | Chemla | 361/103 |
| 6,134,667 A | 10/2000 | Suzuki et al. | 713/300 |
| 6,135,718 A | 10/2000 | Yang | 417/22 |
| 6,172,611 B1 | 1/2001 | Hussain et al. | 340/584 |
| 6,204,623 B1 | 3/2001 | Levy et al. | 318/641 |
| 6,243,656 B1 | 6/2001 | Arai et al. | 702/132 |
| 6,321,175 B1 | 11/2001 | Nagaraj | 702/132 |

OTHER PUBLICATIONS

*Independently Controlling Passive And Active Cooling In A Computer System*, Mark W. Peters et al., U.S. Appl. No. 09/368,950, filed Aug. 5, 1999 (45 p.).

*Computer Fan Speed System To Reduce Audible Perceptibility Of Fan Speed Changes*, Charles J. Stancil et al., U.S. Appl. No. 09/443,575, filed Nov. 19, 1999 (23 p.).

*Mobile Pentium® II Processor and Pentium II Processor Mobile Module Thermal Sensor Interface Specifications*, Intel® Corporation, AP–825, Application Note, Apr. 1998, Order No.: 243724–001.

*System Management Bus Specification*, Smart Battery System Specifications, Revision 1.1, Dec. 11, 1998, Copyright © 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG.

*Mobile Pentium® II Processor In Mini–Cartridge Package At 366 MHZ, 300 PE MHZ, and 266 PE MHZ*, Intel® Corporation, Order No.:245108–001, 1998.

*Low Cost PC Temperature Monitor And Fan Control ASIC*, Analog Devices, Preliminary Technical Data, ADM1022, Rev. PrJ 3/99 (20 pp.).

Primary Examiner—Leo Picard
Assistant Examiner—Steven R. Garland

(57) ABSTRACT

A temperature control system for an electronics system minimizes fan noise as much as possible. The system, which may be a computer, is capable of implementing a plurality of temperature control protocols. Each protocol generally specifies fan speed as a function of temperature. When the system initializes, a protocol is selected that, on average, is quieter than at least one other protocol, and preferably all other protocols. The system monitors its own temperature and, if the temperature reaches a threshold, the system causes the initial temperature control protocol to be changed to a different protocol that is better able to cool the system, albeit with a resulting louder sound level.

8 Claims, 3 Drawing Sheets

ADAPTIVE FAN CONTROLLER FOR A COMPUTER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to cooling a computer system. More particularly, the present invention relates to a technique for cooling a computer while reducing fan noise. Still more particularly, the invention relates to the use of throttling capabilities in a computer to dynamically select a thermal solution which is quieter than other thermal solutions.

2. Background Information

Computer systems include numerous electrical components that draw electrical current to perform their intended functions. A computer's microprocessor or central processing unit ("CPU") requires electrical current to perform many functions such as controlling the overall operations of the computer system and performing various numerical calculations. Any electrical device through which electrical current flows produces heat. The amount of heat any one device generates generally is a function of the amount of current flowing through the device.

Typically, each manufacturer designs its products to operate correctly within a predetermined temperature range. If the temperature exceeds the predetermined range (i.e., the device becomes too hot or too cold), the device may not function correctly thereby potentially degrading the overall performance of the computer system. Thus, it is desirable for a computer system generally, and its components specifically, to operate within a thermally benign environment.

A conventional computer system includes one or more fans to blow air over the electronics to keep the electronics cool. A fan's ability to cool a computer is a function of the volume and speed of the airflow it is able to create. Faster fans generally provide greater cooling ability than slower fans. Fans, however, also make noise and the noise level is a function of the speed of the fan; faster are noisier than slower fans.

In some computers, the fan is turned when the computer is turned on and spun at a predetermined speed until the computer is turned off. Although satisfactory for cooling purposes, this approach results in the fan continuously making a great deal of noise, which is generally annoying to the operator. In other computers, to reduce fan noise, the fan is activated upon boot up the fan is activated to a relatively slow speed and only spun faster if it is determined (using a thermal sensor) that the computer has become hotter. Once an increase in temperature is detected, the fan speed is increased. This approach recognizes that a computer that has just booted up and does not yet generate much heat does not need its fan to spin at its higher speed. Such a computer may include one or more temperature sensors that are monitored to determine the thermal state of the computer. If it is determined that the computer is becoming too hot, the fan's speed can be increased. Although this disadvantageously increases the sound level of the computer, it is a necessary action to keep the computer from over heating. Moreover, it is important to keep the computer (e.g., the microprocessor) from becoming so hot that it functions unsafely or unreliably. To prevent unreliable operation, the fan speed is increased with an increase in temperature even though the temperature has not yet reached a critical level. Ramping up fan speed before a critical temperature is reached is generally necessary to head off a thermal problem from occurring.

Early microprocessors dissipated a couple of watts of energy. Today's microprocessors dissipate tens of watts (e.g., 60 watts). Because computers have become more and more powerful, they also have become hotter, thereby requiring a cooling system that can handle the increased thermal loads. This requirement generally has meant making the fans larger, adding additional fans, and/or making the fans spin faster. The sound level of computer cooling systems therefore has increased making the noise problem more severe. As a result, there is a tremendous need to provide a cooling system for a computer that minimizes the sound level of the fans as much as possible. These two design goals are generally at odds with each other—a fan capable of keeping a computer sufficiently cool generates a great deal of noise and a quiet fan may be unable to sufficiently cool the computer, all else being equal. Accordingly, there is a need to provide a cooling system for a computer that effectively trades off system cooling and fan noise.

BRIEF SUMMARY OF THE PREFERRED EMBODIMENTS OF THE INVENTION

The problems noted above are solved in large part by a temperature control system for an electronics system that tries to minimize fan noise as much as possible. In accordance with the preferred embodiment, the system is capable of implementing a plurality of temperature control protocols. Each protocol generally specifies fan speed as a function of temperature. When the system initializes, a protocol is selected that, on average, is quieter than at least one other protocol, and preferably all other protocols. The system, or a device within the system, monitors its own temperature and, if the temperature reaches or exceeds a threshold, the system causes the initial temperature control protocol to be changed to a different protocol that is better able to cool the system, albeit with a resulting louder sound level. In accordance with one embodiment of the invention, the electronic system comprises a computer having one or more fans that are controlled as described above. If desired, three or more protocols can be implemented, each protocol resulting in a sound level and thermal cooling ability that is different from the other protocols.

In this manner, the system attempts to keep its cooling system as quiet as possible. Initially, the system selects a quiet means to cool itself, but if that means proves unable to keep the system sufficiently cool, the system will switch another thermal control protocol that may better be able to cool the system. Accordingly, the system attempts to minimize sound level associated with the cooling system (i.e., fans), but will switch to a louder cooling protocol if necessary. These and other advantages will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
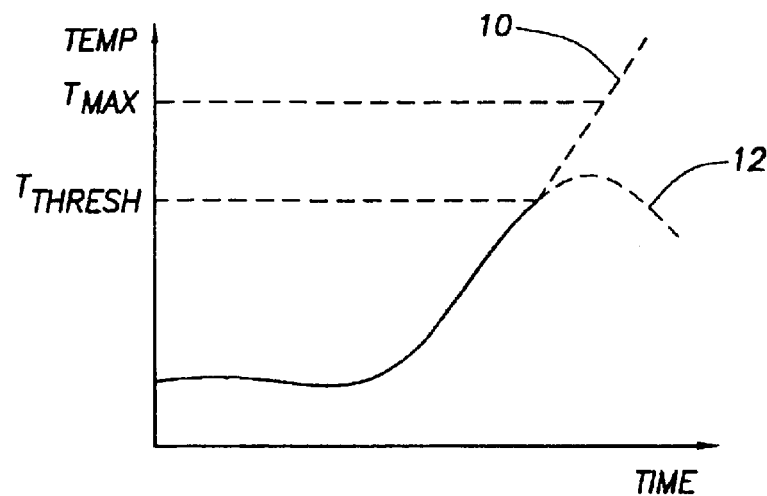
FIG. 1 shows an exemplary graph of temperature in relation to time for a conventional computer system.

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. In addition, the term "throttling" or "throttling back" a device or system means to change the operating state of the device or system so that the device/system draws less power. For example, throttling back a CPU may include reducing the clock frequency of the CPU. To the extent that any term is not specially defined in this specification, the intent is that the term is to be given its plain and ordinary meaning.

DETAILED DESCRIPTION OF THE PREFERRED EMBODIMENTS

As noted above, conventional computer systems generally increase the speed of the fan(s) upon determining that the temperature of one or more portions of the computer has exceeded a threshold. The threshold is less than the maximum temperature that can be tolerated by the computer system or a device within the system. For example, if the internal temperature of the microprocessor is being monitored, the maximum tolerated temperature is the temperature at which the processor may cease to operate safely and/or reliably. By increasing fan speed before reaching the system's maximum allowable temperature, the system is prevented (hopefully) from ever reaching its maximum allowable temperature.

The maximum allowable temperature is described above as being the temperature above which safe and/or reliable operation cannot be guaranteed. Accordingly, it should be understood that the maximum temperature is a temperature specified by the manufacture of the system or a component internal to the system. More generally, the maximum allowable temperature is simply a temperature above which the system should not reach for whatever reason.

The preferred embodiments of the invention results, at least in part, from the recognition, that there are instances in which fan speed does not need to be increased despite the system experiencing increased temperature. In general, it is simply desired that the temperature, although elevated, remains less than the maximum allowable level. Thus, an increase in temperature above a base line level may indicate that the temperature is rising towards the maximum level, but may or may not ever reach the maximum level. A temperature increase may be only transient in nature caused, for example, by a peripheral device such as a hard disk drive being activated for a short period of time.

This concept is illustrated conceptually in FIG. 1 which shows temperature plotted against time. Initially, the temperature is at minimum value when the computer has just booted up. As time progresses, the system warms up slightly. At some point in time, however, the temperature may reach the threshold (Tthresh) at which, because overheating may be imminent, the system increases the speed of its fan(s). However, it is unknown at that point whether the system would ever have reached its maximum allowable temperature (Tmax) without an increase in fan speed. On one hand, the temperature might have followed curve 10 and reached Tmax. On the other hand, the temperature might have followed curve 12 rising some, and then decreasing and never reaching Tmax.

The preferred embodiment of the invention will now be described with respect to FIG. 2. As shown, a temperature control unit 30 couples to an electronics unit 20 and an adjustable speed fan 40. Additional fans also can be included. The temperature control unit 30 may be logic separate from the electronics unit or be implemented in logic contained within the electronics unit. The electronics unit 20 generally comprises any type of electronics assembly that performs any function whatsoever. For example and without limitation, the electronics unit 20 may be a computer. The temperature control unit receives signals 22 and 24 from the electronics unit 20 and control the speed of fan 40. Signal 22 preferably is indicative of the temperature recorded by a temperature sensor 26 in, or associated with, the electronics unit 20. The temperature sensor may comprise, for example, a thermal diode internal to a microprocessor within the electronics unit. Signal 22 may be a signal in any format, but preferably comprises an analog signal that is a function of the temperature detected by sensor 26. Signal 24 preferably comprises a digital signal that is asserted by the electronics unit 20 when the electronics unit 20 has reached a temperature that is at or below (and preferably near) the maximum allowable temperature, Tmax. Signal 24 is thus called a "HOT" signal.

Figure 3:
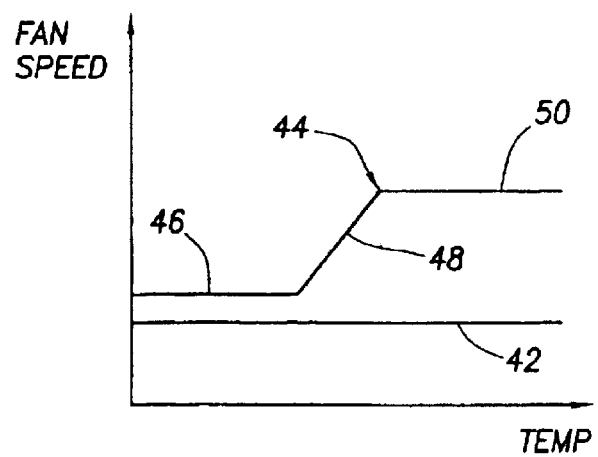
FIG. 3 shows several exemplary temperature control protocols.

In accordance with the preferred embodiment of the invention, the temperature control unit 30 implements at least two temperature control protocols. Each protocol preferably permits the temperature control unit 30 to operate the fan 40 at a speed that may be a function of another parameter, such as temperature, or may be static (i.e., the fan is run at a constant speed). Referring briefly to FIG. 3, two exemplary temperature control protocols 42 and 44 are shown. Protocol 42 is static and thus the associated fan speed is unchanging even in the face of changing temperature.

Protocol 44 is a function of temperature. In a lower temperature region 46, fan speed is set at a lower value while at a higher temperature region 50, fan speed is set at a higher value. In the intermediate temperature region, fan speed varies with temperature generally linearly as shown or otherwise (e.g., in graduated steps or increments). In accordance with one embodiment, a first temperature control protocol is static while a second temperature control protocol includes a fan speed that is a function of temperature. In another embodiment, both temperature control protocols include fan speeds that vary with temperature, such as protocol 44 shown in FIG. 3.

Preferably, however, one protocol results in a lower fan noise level than the other protocol. Lower fan noise may result from the fan running at a slower average speed than the other louder protocol. It should be understood, however, that, all else being equal, a quieter fan protocol may be unable to cool the electronics unit 20 as well or as efficiently as a louder fan protocol. Accordingly, the lower noise level temperature control protocol provides less cooling capability, but at a lower noise level than the other protocol which cools the system better, albeit at a louder noise level.

Upon system initialization (e.g., computer boot up), temperature control unit 30 initializes itself to implement the quieter temperature control protocol. A quieter protocol (i.e., less average fan noise) is highly desirable to the operator. The temperature control unit 30 continues to implement the quieter protocol until it is determined that the protocol is unable to sufficiently cool the electronics unit 20. That determination is made by the electronics unit 20 by monitoring the temperature recorded by the temperature sensor 26. When the electronics unit 20 determines that the maximum allowable temperature may be, or has been, exceeded, it asserts the HOT signal 24. This signal causes the temperature control unit 30 to change the temperature control protocol from the initial quieter protocol to a protocol better able to cool the computer, albeit in a louder manner such as by increasing the average speed of the fan 40. In addition to asserting HOT signal 24, the electronics unit 20 may also take an action to reduce its temperature. This may be accomplished by reducing or ceasing a functional aspect of the electronics unit. For example, if the electronics unit 20 includes a microprocessor, the clock speed of the microprocessor can be reduced to cause the processor to operate at a slower speed, which requires less power and thus generates less heat.

The preferred embodiment of the invention is based on the assumption that the temperature of the electronics unit 20 will remain low enough that the initial temperature control protocol implemented by the temperature control unit 30 can satisfactorily dissipate enough heat to keep the electronics unit operating at less than the maximum allowable temperature. This assumption in no way is a limitation on the embodiments described herein or the claims that follow. The assertion of the HOT signal 24 indicates that the initial temperature control protocol is unable to keep the electronics unit 20 cool enough for safe and reliable operation given the current processing demands and functions performed by the electronics unit and a thermally more aggressive, albeit louder, protocol is implemented. The initial working hypothesis is that a quieter thermal control protocol is sufficient and the system initializes itself accordingly. That protocol is kept in place until the initial hypothesis is proven to be incorrect at which time the system reconfigures itself for a more aggressive, louder thermal protocol. In this manner, the system will function more quietly than it would have with conventional thermal control methodologies, but still be able to sufficiently cool the system with a louder protocol should the need arise.

Figure 4:
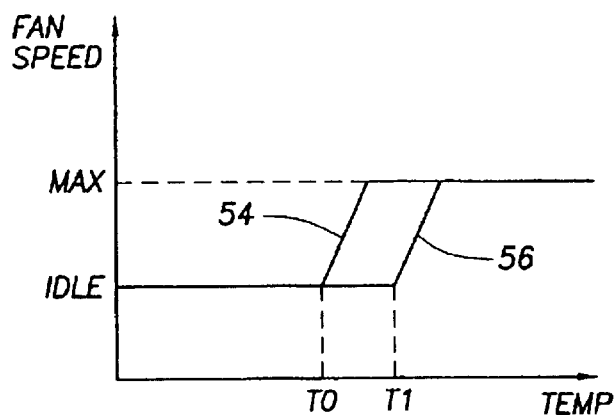
FIG. 4 shows two temperature control protocols in accordance with the preferred embodiment of the invention.

FIG. 4 shows an exemplary embodiment of two thermal control protocols 54 and 56. As shown, protocols 54 and 56 represent the speed of fan 40 as a function of temperature. In both protocols, fan speed is set a lower (quieter) idle speed until the temperature reaches a threshold (T0, T1). After the applicable threshold is reached, the fan speed is ramped up until a maximum speed (louder) is reached.

Because threshold T1 in protocol 56 is higher than threshold T0 in protocol 54, protocol 56 keeps the fan 40 spinning at the quieter idle speed at temperatures at which the protocol 54 would force the fan to spin faster. Thus, on average thermal control protocol 56 is generally considered to be quieter than protocol 54. Initially, thermal control unit 30 (FIG. 2) implements quieter protocol 56 until it is determined that protocol 56 is insufficient. At that point, the electronics unit 20 alerts the temperature control unit 30 of this condition and the temperature control unit switches to protocol 54. Because protocol 54 requires the fan's speed to be increased at lower temperatures, the system temperature should remain lower than would have been the case with protocol 56 and thus protocol 56 works better to cool the system, albeit in conjunction with louder noise.

Figure 2:
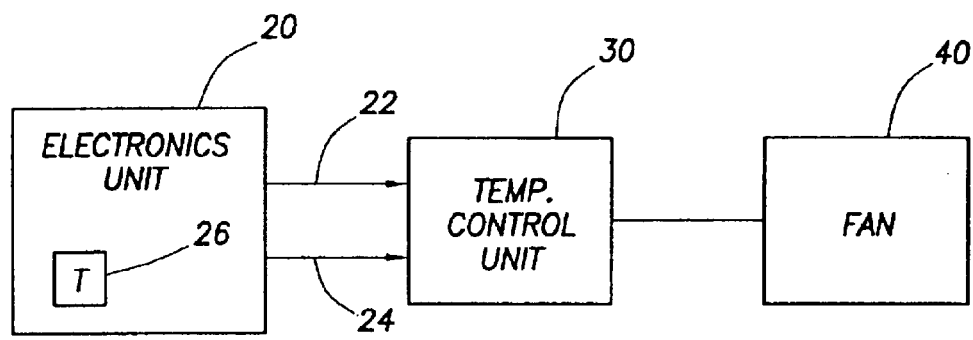
FIG. 2 shows an electronic system constructed in accordance with the preferred embodiment.
Figure 5:
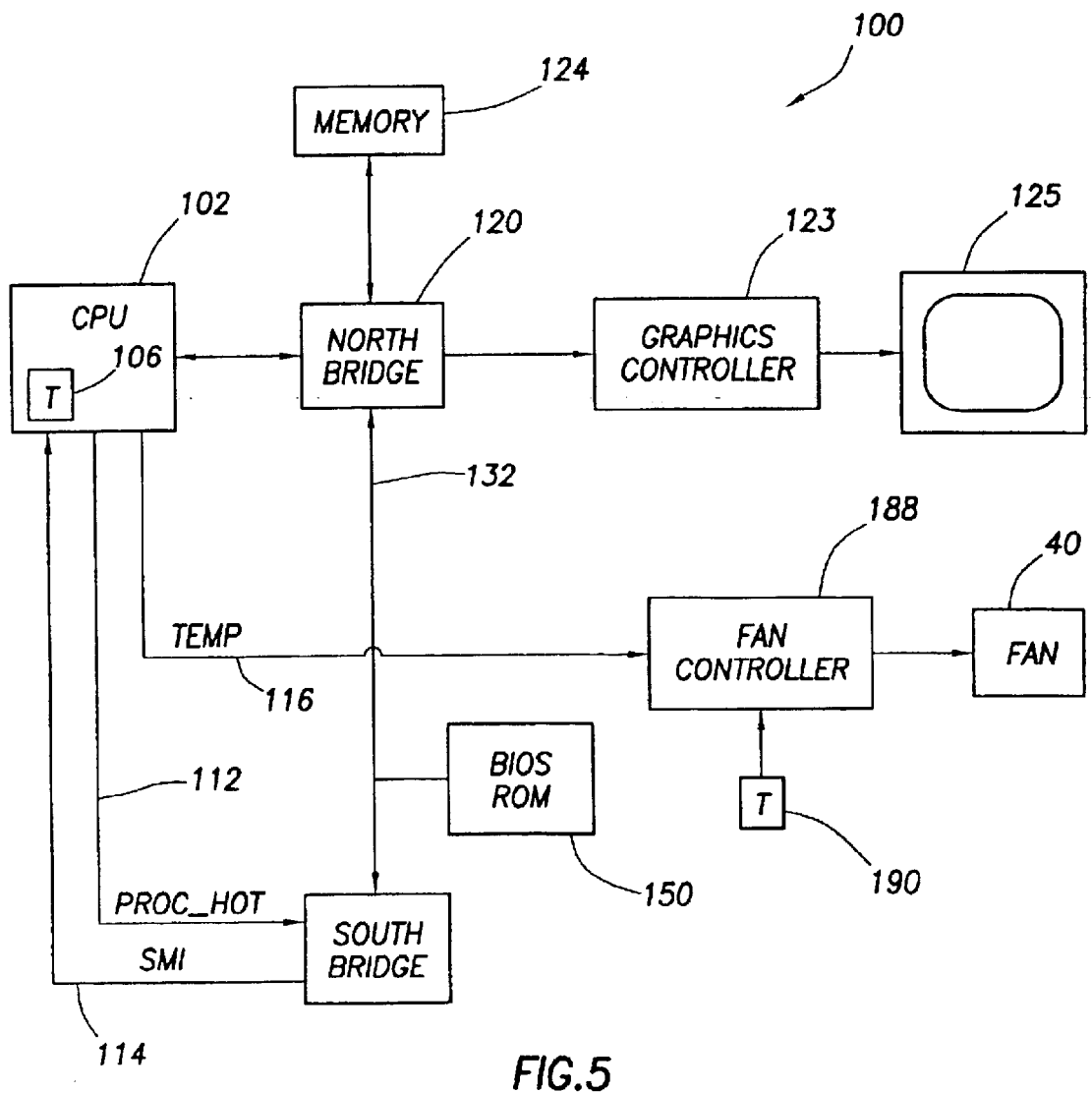
FIG. 5 shows a detailed block diagram of the electronic system of FIG. 2.

Numerous embodiments exist of the logic shown in FIG. 2. Referring now to FIG. 5, for example, one such exemplary embodiment comprises a computer system 100. As shown, computer system 100 includes a central processing unit ("CPU") 102, bus bridge devices 120 and 130, main memory 124, a fan controller 188, a temperature sensor 190, and a fan 40. As shown, computer system 100 also includes a graphics controller 123, a display 125, a Basic Input/Output System Read Only Memory ("BIOS ROM") 150, and an input device 172, such as a keyboard or mouse. One of ordinary skill in the art will recognize that computer system 100 may include other components such as mass storage devices, a network interface controller ("NIC"), a power supply, etc.

In accordance with the preferred embodiment of FIG. 5, the electronics unit 20 and thermal control unit 30 of the embodiment of FIG. 2 are implemented using as much hardware as possible that already is present in a conventional computer system. For example, at least some of the functions performed by the thermal control unit 30 are performed by CPU 102 executing BIOS ROM code as described below. If desired, however, additional hardware can be added to the computer system diagram of FIG. 5.

As shown in FIG. 5, CPU 102 couples to a bridge device 120 (e.g., a north bridge). Memory 124 preferably comprises a memory array coupled to the north bridge 120, and the north bridge preferably includes a memory control unit (not shown) that controls transactions to the main memory 124 by asserting various control signals during memory accesses. The main memory 124 functions as the working memory for the CPU 102 and the rest of the computer system 100 and generally includes a conventional memory device or array of memory devices in which application programs and data are stored. The main memory array 124 may comprise any suitable type of memory such as dynamic random access memory ("DRAM") or any of the various types of DRAM devices such as synchronous dynamic random access memory ("SDRAM"). The computer system 100 also preferably includes a graphics controller 123 that couples to the north bridge 120. As one skilled in the art will understand, the graphics controller 123 controls the rendering of text and images on the display device 125. The graphics controller 123 may embody a typical graphics accelerator generally known in the art to render three-dimensional data structures on display 125. The display 125 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

The north bridge 120 couples to the south bridge 130 via a suitable bus 132. Bus 132 may be a peripheral component interconnect ("PCI") bus, "Fire Wire" bus, or another suitable type of bus. The preferred embodiment of the present invention, however, is not limited to any particular type of bus, and thus various busses may be used including a high speed (66 MHz or faster) PCI bus. In the preferred embodiment, a plurality of peripheral devices reside on the bus 132. The peripheral devices may include, for example, BIOS ROM 150 as shown or other devices not specifically shown such as network interface controllers ("NICs"), video accelerators, audio cards, hard or floppy disk drives, PCM-CIA drives, Small Computer Systems Interface ("SCSI") adapters and telephony cards. Although not explicitly shown, the south bridge 130 may couple or "bridge" the bus 132 to other secondary expansion busses.

The BIOS ROM 150 contains firmware embedded on a ROM memory chip and performs a number of low-level functions. For example, the BIOS code executes the power on self test ("POST") during system initialization ("boot up"). The POST routines test various subsystems in the computer system, isolate faults and report problems to the user. The BIOS code also is responsible for loading the operating system into the computer's main system memory. Further, the BIOS code handles the low-level input/output transactions to the various peripheral devices such as the hard disk drive and floppy drives. It should be understood that the BIOS code is stored in ROM 150 and copied to memory 124 for execution therefrom during runtime.

In accordance with the preferred embodiment of the invention, the BIOS code executed by CPU 102 also performs much of the logic described herein regarding the control of the fan and the temperature control protocols. For example, the plurality of temperature control protocols explained above may be implemented by the CPU 102 executing the BIOS code.

Preferably, the CPU 102 comprises a processor that includes an internal temperature sensing capability. For example, the CPU 102 may comprise Intel's Pentium 4 processor which includes internal thermal diodes. A Pentium 4 processor is capable of providing an output signal that is indicative of the instantaneous temperature in the processor (e.g., die or case temperature). This signal is represented as TEMP signal 116 in FIG. 5. Signal 116 may be dedicated to provide temperature or be an output signal over which various parameters including temperature are provided. For example, signal 116 may be an I$^2$C bus. The Pentium 4 processor also includes a digital output signal that is asserted when the processor's internal temperature exceeds a threshold for safe and reliable operation. That signal is shown in FIG. 5 as PROC_HOT_signal 112 which is provided to the south bridge 130. The temperature signal 22 and the HOT signal 24 from the embodiment of FIG. 2, therefore, are represented by the CPU's TEMP signal 116 and the PROC_HOT_signal 112, respectfully.

In accordance with the operation of the Pentium 4, when the internal temperature of the device exceeds a threshold, the PROC_HOT_signal is asserted and the CPU throttles back. Preferably, the CPU clock frequency also is reduced during this condition so that the CPU operates more slowly. Slower operation results in less power draw and thus less heat generation. Thus, when the CPU detects that it is becoming too hot, it changes its mode of operation so that it generates less heat to alleviate the potential over temperature problem. The Pentium 4's thermal control algorithm (throttling back clock speed) also assumes that an external cooling system is provided in the computer to assist in cooling the device. Intel has indicated that the Pentium 4's internal thermal control capability will keep the device cool enough to continue operating safely and reliably if the external cooling system can dissipate enough heat to keep the case temperature of the device below its maximum allowable level when the CPU is running at 65% of its rated power. Accordingly, the initial temperature control protocol includes a fan speed sufficient to comply with this requirement given, as one of ordinary skill would understand, the size of the fan, number of fans, geometry of the enclosure containing the system, etc. In general, the initial temperature control protocol is sufficient to comply with whatever requirements, if there are any, are necessary to keep the system operating reliably.

Referring still to FIG. 5, when PROC_HOT_asserts, the south bridge 130 issues a system management interrupt signal ("SMI") to the CPU 102. The CPU responds by determining the source of the SMI and executing BIOS interrupt code that corresponds, in this case, to the PROC_HOT_signal. This interrupt code causes the fan controller 188 to switch temperature control protocols as explained herein.

Figure 6:
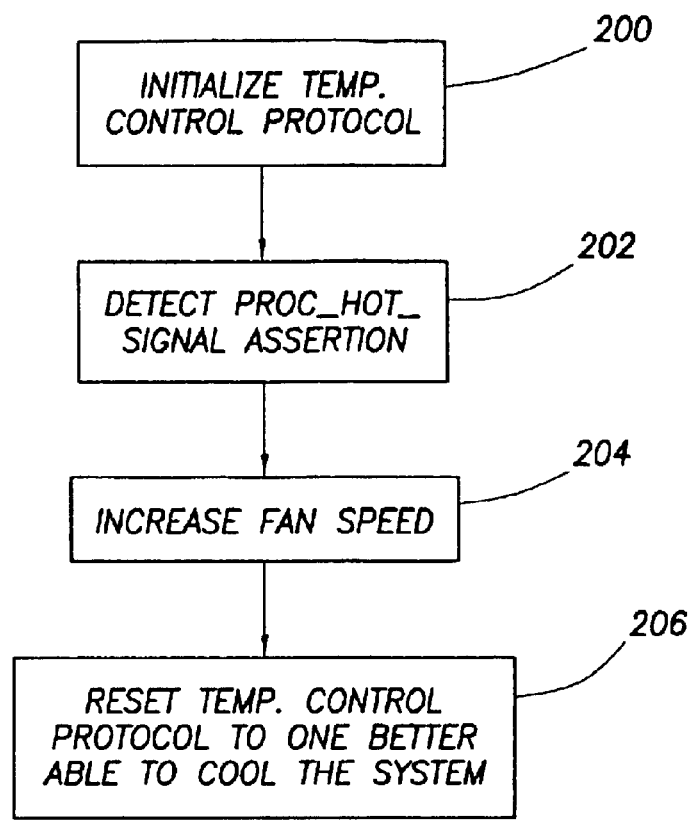
FIG. 6 shows a flow chart illustrating the operation of the cooling system of the preferred embodiment.

FIG. 6 illustrates one exemplary embodiment of the logic to thermally control the system 100. In step 200, the system is initialized to a state in which a first temperature control protocol is selected and implemented. As explained above, this protocol preferably results in lower average sound level than other protocols that could be implemented. This initial protocol may also be selected to at least partially comply with any requirements imposed by the CPU or system manufacturers. The first protocol is maintained in place until the CPU 102 asserts the PROC_HOT_signal indicating that the external thermal control system (i.e., the fan) is unable to keep the CPU sufficiently cool and the CPU is forced to change its operation to draw less power (i.e., throttle back CPU clock frequency). In response, the CPU, executing BIOS code, causes the fan controller 188 to increase the speed of fan 40 to help cool the CPU. The CPU also causes the first quieter protocol to be switched to a second louder protocol (step 206).

Figure 7:
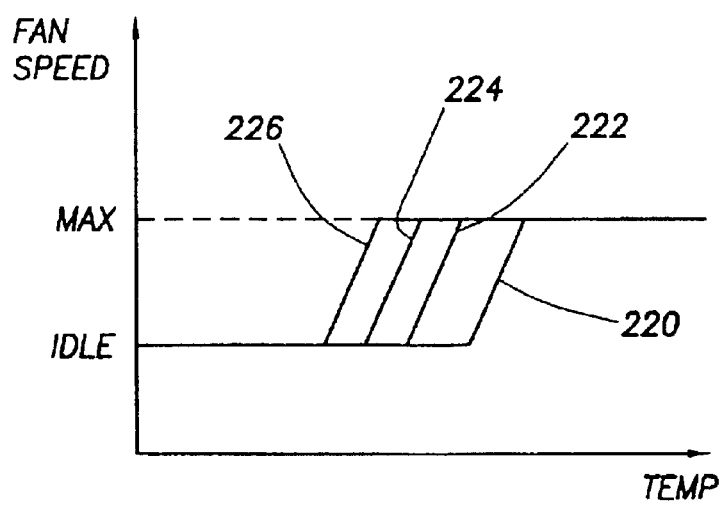
FIG. 7 graphically depicts an alternative operation of a preferred embodiment of the invention.

FIG. 7 illustrates an alternative embodiment in which four temperature control protocols 220–226 can be implemented. As shown, all of the protocols have the same idle fan speed (although that is not necessarily the case). Protocol 220 causes the fan speed to increase at higher temperatures relative to other three protocols 222–226. Accordingly, protocol 220 is the quietest protocol (lowest average fan speed over a given temperature range), while protocol 226 is the loudest. Protocols 222 and 224 are of intermediate loudness with protocol 222 being quieter than protocol 224. Initially, protocol 220 is implemented. The first time PROC_HOT_is asserted by CPU 102, the fan controller 188 causes a switch in protocols to the next quietest protocol 222. If PROC_HOT_again asserts, the protocol is switched to protocol 224 and then 226 if PROC_HOT_asserts yet again. If desired, an intermediate protocol (e.g., 222 or 224) can be skipped. Further, more or less than four protocols can be implemented and the protocols do not all need to have the same idle and maximum fan speeds. The point of FIG. 7 is simply that, if desired, three or more protocols can be implemented with varying levels of average noise level and the system can initially use the quietest protocol, but switch to noisier protocols as necessary (i.e., if the quieter protocols prove to be incapable of providing sufficient cooling with the CPU having to throttle itself to a lower power draw mode of operation).

The above discussion is meant to be illustrative of the principles and various embodiments of the present invention. Numerous variations and modifications will become apparent to those skilled in the art once the above disclosure is fully appreciated. For example, the above protocols involve changes in the speed of a fan, but can be implemented with other techniques and device for cooling an electronics system (e.g., refrigeration). Further, the particular circuit implementations shown in the figures may be modified in a number of different ways without departing from the principles and scope of this disclosure. Components can be added or removed from the circuits and different circuits altogether that provide the same benefits and functionality can be used. It is intended that the following claims be interpreted to embrace all such variations and modifications.

What is claimed is:

1. An electronic system, comprising:
   an electronics unit;
   a temperature control logic coupled to said electronics unit; and
   a fan coupled to said temperature control unit;
   wherein maid temperature control unit implements a first temperature control protocol upon system initialization and changes to a second temperature control protocol if said electronics unit asserts a temperature signal, the first and second temperature control protocols effecting the speed of the fan;
   wherein said first temperature control protocol comprises at least two fan speeds, a higher fan speed being selected when the temperature, recorded by a temperature sensor, exceeds a first temperature threshold and a lower fan speed selected when the temperature is below the first temperature threshold; and
   wherein said second temperature control protocol comprises at least two fan speeds, a higher fan speed being selected when the temperature, recorded by a temperature sensor, exceeds a second temperature threshold and a lower fan speed selected when the temperature is below the second temperature threshold, said second temperature threshold being less than the first temperature threshold.

2. A computer system, comprising:
   a CPU;
   a fan controller coupled to said CPU; and
   a fan coupled to said fan controller;
   wherein said CPU is capable of implementing a plurality of temperature control protocols, all of said protocols effecting the speed of said fan as a function of only one variable temperature indication;
   wherein said CPU implements a first temperature control protocol upon system initialization and changes to a second temperature control protocol if said CPU asserts a temperature signal, wherein said first temperature control protocol causes the fan to spin at a different speed than the second temperature control protocol for the same level of the temperature indication;
   wherein said first temperature control protocol comprises at least two fan speeds, a higher fan speed being selected when the temperature, recorded by a temperature sensor, exceeds a first temperature threshold and a lower fan speed selected when the temperature is below the first temperature threshold; and
   wherein said second temperature control protocol comprise at least two fan speeds, a higher fan speed being selected when the temperature, recorded by a temperature sensor, exceeds a second temperature threshold and a lower fan speed selected when the temperature is below the second temperature threshold, said second temperature threshold being less than the first temperature threshold.

3. The system of claim 2 wherein said CPU implements a third temperature control protocol that is louder than said second temperature control protocol.

4. The claim 3 wherein said second temperature control protocol is implemented the first time the temperature signal is asserted and the third temperature control protocol is implemented the second time the temperature signal is asserted.

5. The system of claim 2 wherein said CPU internally monitors its temperature and asserts the temperature signal which indicates the CPU's internal temperature has reached a threshold.

6. A method of controlling temperature in an electronic system, comprising:
   initializing the system to a first temperature control protocol that reacts to only one temperature indication;
   determining that a temperature associated with the electronic system has reached a threshold; and
   switching from the first temperature control protocol to a second temperature control protocol that also reacts to only one temperature indication and the same temperature indication as for the first temperature control protocol, said first temperature control protocol being quieter on average than sold second temperature control protocol and wherein said first temperature control protocol causes a fan to spin at a different speed than the second temperature control protocol for the same level of the temperature indication;
   wherein said first temperature control protocol comprises at least two fan speeds, a higher fan speed being selected when the temperature, recorded by a temperature sensor, exceeds a first temperature threshold and a lower fan speed selected when the temperature is below the first temperature threshold;
   wherein said second temperature control protocol comprises at least two fan speed, a higher fan speed being selected when the temperature, recorded by a temperature sensor, exceeds a second temperature threshold and a lower fan speed selected when the temperature is below the second temperature threshold, said second temperature threshold being less than the first temperature threshold.

7. The method of claim 6 further including switching to a third temperature control protocol that is louder than said second temperature control protocol.

8. The method of claim 7 wherein switching to the third temperature control protocol occurs if it is determined that the threshold has again been reached.

* * * * *

UNITED STATES PATENT AND TRADEMARK OFFICE
CERTIFICATE OF CORRECTION

| | | |
|---|---|---|
| PATENT NO. | : 6,873,883 B2 | Page 1 of 1 |
| APPLICATION NO. | : 10/036273 | |
| DATED | : March 29, 2005 | |
| INVENTOR(S) | : Gregory P. Ziarnik | |

It is certified that error appears in the above-identified patent and that said Letters Patent is hereby corrected as shown below:

IN THE CLAIMS

Claim 1, Column 9, line 21, delete "maid" and insert therefor --said--

Claim 6, Column 10, line 34, delete "sold" and insert therefor --said--

Signed and Sealed this

Twenty-sixth Day of January, 2010

David J. Kappos
*Director of the United States Patent and Trademark Office*